United States Patent [19]

Minamitani et al.

[11] 4,370,742

[45] Jan. 25, 1983

[54] TIME DIVISION ELECTRONIC SWITCHING SYSTEM

[75] Inventors: Eiji Minamitani, Yokohama; Kiyoo Ozawa, Kawasaki; Takashi Yokoto, Tokyo, all of Japan

[73] Assignee: Fujitsu Limited, Kawasaki, Japan

[21] Appl. No.: 187,420

[22] Filed: Sep. 15, 1980

[30] Foreign Application Priority Data

Sep. 20, 1979 [JP]  Japan ................ 54/121423

[51] Int. Cl.³ .............. H04J 3/00; H04Q 11/04
[52] U.S. Cl. ............................................ 370/58
[58] Field of Search ............... 370/58, 53, 62, 61, 370/66, 77, 92, 57, 63

[56] References Cited

U.S. PATENT DOCUMENTS

| | | | |
|---|---|---|---|
| 4,122,310 | 10/1978 | Ryden et al. | 370/58 |
| 4,160,127 | 7/1979 | Slana et al. | 370/63 |
| 4,257,119 | 3/1981 | Pitroda | 370/58 |

*Primary Examiner*—Thomas A. Robinson
*Attorney, Agent, or Firm*—Staas & Halsey

[57] ABSTRACT

A time division electronic switching system including, as main structural elements, a central processing unit, a multi-frequency signal receiver unit, a signal processor and a time division switch including a speech path memory. Dial information from a subscriber or from another telephone office is detected in the multi-frequency signal receiver unit, the output of the multi-frequency signal receiver unit is written into the speech path memory, and an access circuit reads out the information written in the speech path memory and supplies it to the signal processor as read out information.

7 Claims, 13 Drawing Figures

TIME DIVISION ELECTRONIC SWITCHING SYSTEM

BACKGROUND OF THE INVENTION

The present invention relates to a time division electronic switching system in which the interfaces of a signal processor with a push-button dial signal receiver and a multi-frequency signal receiver are simplified and expansion of the system is facilitated.

In a conventional time division electronic switching system, the main structural elements of the time division electronic switching system are a central processing unit, a signal processor and a time division switch including a speech path memory. The time division electronic switching system is connected to the subscribers and to other telephone offices through line circuits and trunk circuits, respectively. Furthermore, the time division electronic switching system includes a tone trunk for dial tones and call progress tones, a signal receiver circuit for receiving dial signals, especially push-button dial signals, and a multi-frequency signal receiver circuit for converting into analog signals the signals transmitted to other telephone offices and for converting to digital signals analog signals received from other telephone offices. The signal processor comprises, as main elements, a signal distributing circuit, a switch control circuit and a scanning circuit. The scanning circuit of the signal processor periodically makes a status scan of the line circuits and trunk circuits looking for the on-hook or off-hook state of a subscriber or the state of the trunk circuit. In the speech path memory, speech representation signals are transmitted while writing into and reading out of the speech path memory not only speech signals of the subscribers but also speech signals from other telephone offices. With respect to the site of the speech path memory and storage for the on-hook/off-hook information of the line circuit, one bit is sufficient per circuit, but 4 bits or 5 bits per line circuit are necessary for storage of the push-button dial signal from the receiver circuit and multi-frequency signal receiver. Furthermore, if the analog-digital conversion system is a Pulse Coded Modulation (PCM) system, 8 bits per circuit are necessary for the speech path memory. Accordingly, in the conventional electronic switching system, interfacing the time division switch, including the speech path memory or the signal processor, with another unit is complicated. Therefore, the conventional electronic switching system is disadvantageous in that the possible physical equipment locations are limited because of the system structure and expansion of the system is difficult.

SUMMARY OF THE INVENTION

An object of the present invention is to provide an electronic switching system in which the above-mentioned limitations in the conventional system are eliminated and the interfaces of the time division switch with other units are arranged and simplified to facilitate enlargement of the system.

The above-mentioned object can be achieved by a time division electronic switching system which includes, as the main structural elements, a central processing unit, a multi-frequency signal receiver circuit, a signal processor and a time division switch including a speech path memory.

The multi-frequency signal receiver circuit comprises means for detecting dial information from the subscribers or from other telephone offices. A holding memory means is included in the system for writing the output of the multi-frequency signal receiver circuit into the speech path memory. An access circuit means is additionally included in the system for reading out the information written in the speech path memory and supplying information to the signal processor.

Further features and advantages of the present invention will be apparent from the ensuing detailed description of the preferred embodiments with reference to the accompanying drawings to which, however, the scope of the invention is in no way limited.

BRIEF DESCRIPTION OF THE DRAWINGS

FIG. 1 formed by combining FIGS. 1A and 1B is a block diagram illustrating a conventional time division electronic switching system;

FIG. 2 formed by combining FIGS. 2A and 2B is a block diagram illustrating one embodiment of the time division electronic switching system according to the present invention;

FIG. 3 formed by combining FIGS. 3A and 3B, is a time chart illustrating the operation of the time division electronic switching system of FIG. 2;

DETAILED DESCRIPTION OF THE PREFERRED EMBODIMENT

Figures 1, 1A:
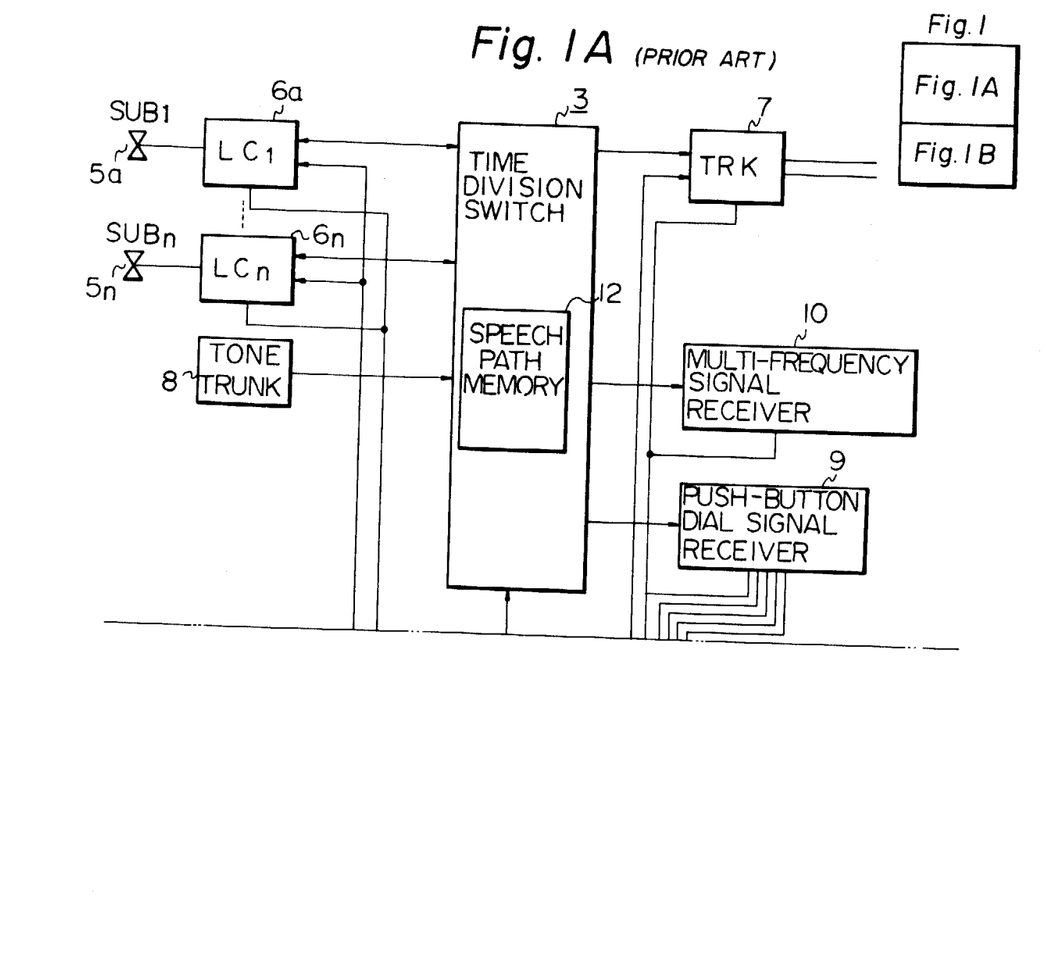
Figure 1B:
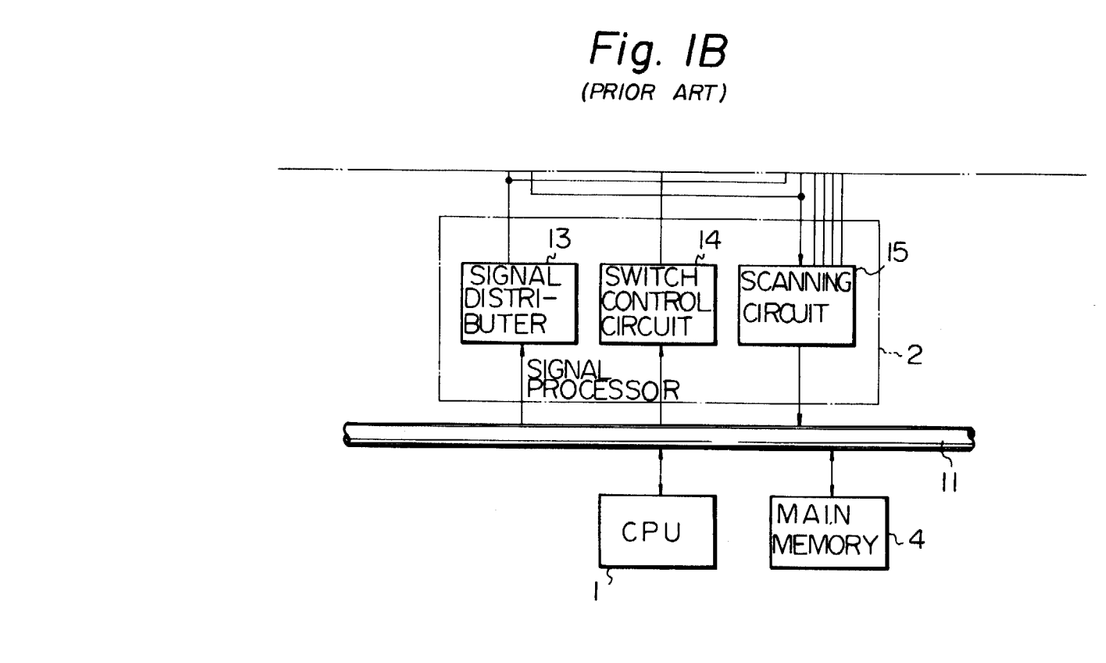

The conventional time division electronic switching system has a block structure as shown in FIG. 1. Referring to FIG. 1, the main structural elements of the time division electronic switching system are a central processing unit 1, a signal processor 2 and a time division switch 3 including a speech path memory 12. The time division electronic switching system of FIG. 1 is connected to subscribers 5a, . . . , 5n through line circuits 6a, . . . , 6n respectively, and connected to another telephone office (not shown in FIG. 1) through a trunk circuit 7. Furthermore, the time division electronic switching system includes a tone trunk 8 for dial tones and call progress tones, a signal receiver circuit 9 for receiving dial signals, especially push-button dial signals, and a multi-frequency signal receiver circuit 10 for converting signals transmitted to other telephone offices from digital to analog and for converting signals received from other telephone offices from analog to digital. The signal processor 2 includes, as the main element, a signal distributing circuit 13, a switch control circuit 14 and a scanning circuit 15. The scanning circuit 15 of the signal processor 2 periodically scans the line circuits 6a, . . . , 6n inspecting for the on-hook or off-hook state of a subscriber 5a, . . . , 5n through the line circuits 6a, . . . , 6n or the state of the trunk circuit 7. In the speech path memory 12, speech representation signals are transmitted while writing into and reading out of the speech path memory not only speech signals of the subscribers 5a, . . . , 5n but also speech signals from other telephone offices (not shown in FIG. 1). The size of the speech path memory depends upon the data stored for each line circuit, for inspection or status information of one of the line circuits, 6a, ..., 6n, one bit is sufficient per circuit, 4 bits or 5 bits per line circuit are additionally necessary for the push-button dial signal receiver circuit 9 and multi-frequency signal receiver circuit 10 and if the analog-digital conversion system is a Pulse Coded Modulation (PCM) system, 8 bits per line circuit in addition to the status bit are necessary for the speech path memory 12. Accordingly, in the conventional electronic switching system illustrated in FIG. 1, interfacing the time division switches including the speech path memory 12 or the signal processor 2 with another unit is complicated. Therefore, the conventional electronic switching system is limited in that the possible physical equipment locations are restricted because of the system structure and enlargement of the system is difficult.

Figures 2, 2A:
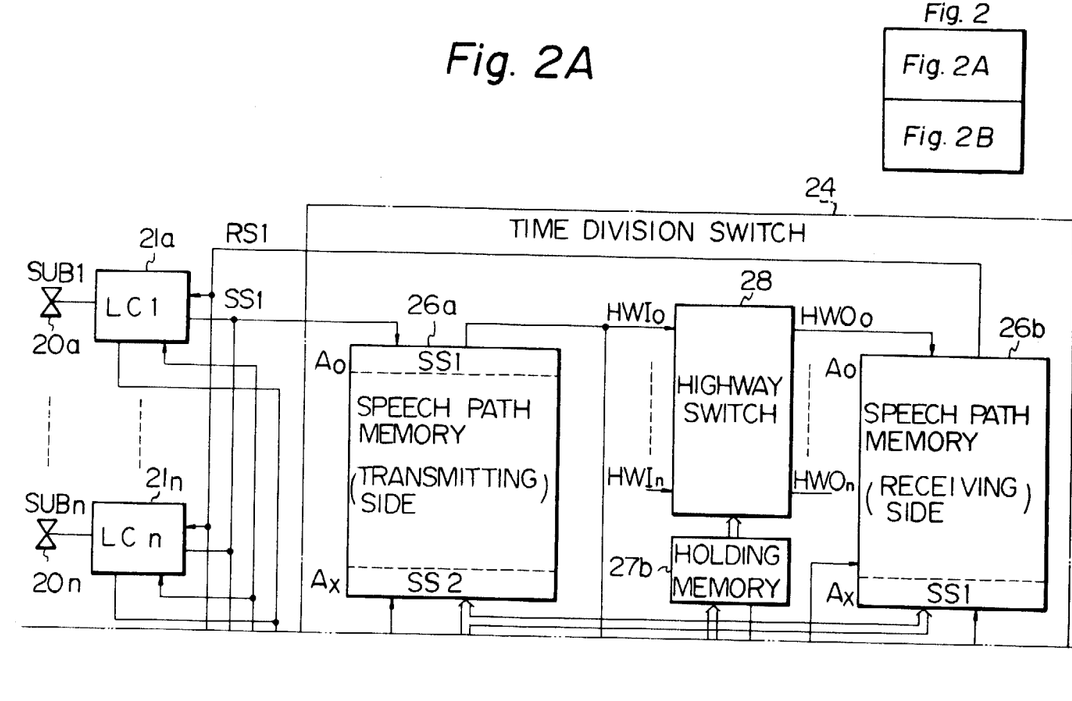
Figure 2B:
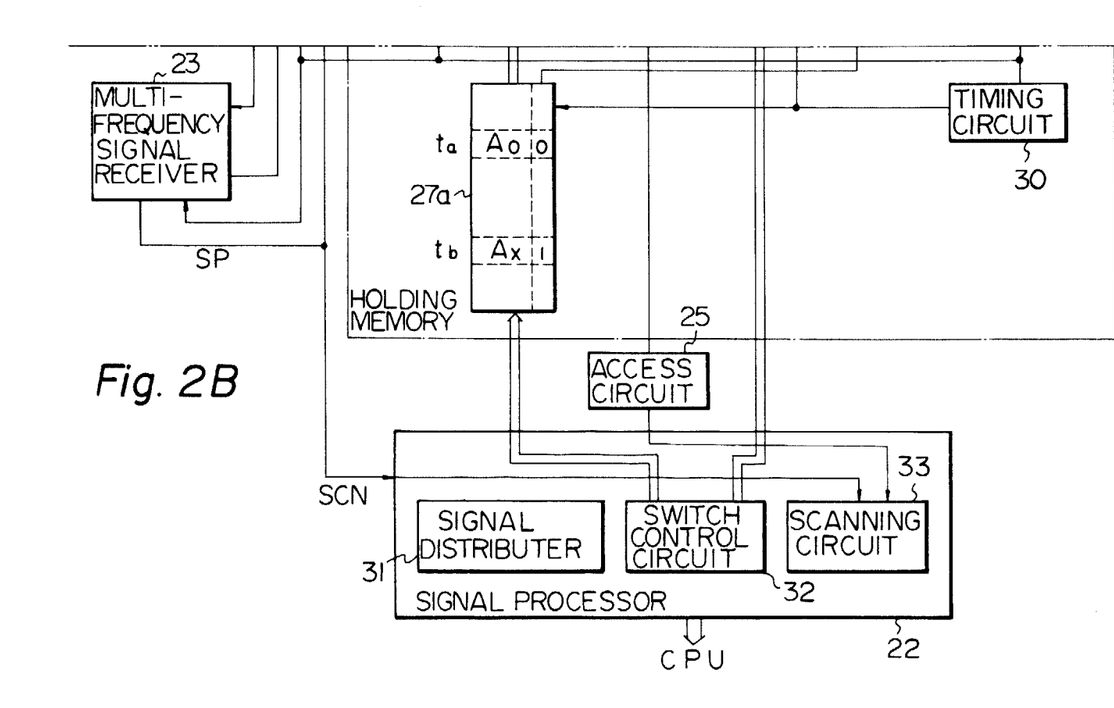

FIG. 2 is a block diagram illustrating the main elements of one embodiment of the present invention and illustrates a time division switch 24 in detail. In FIG. 2, 20a, ..., 20n represent subcribers, blocks 21a, ..., 21n are line circuits, block 22 is a signal processor which includes a signal distributor 31, a switch control circuit 32 and a scanning circuit 33, and block 23 is a multi-frequency signal receiver circuit.

In the time division switch 24 of FIG. 2, 26a represents a speech path memory on the transmitting side, 26b represents a speech path memory on the receiving side, and 27a and 27b represent holding memory circuits. The holding memory circuit 27a controls both the speech path memories 26a and 26b. Block 30 represents a circuit for producing the timing for clock signals, synchronous signals and the like, and block 25 represents an access circuit for reading out the contents of the speech path memory 26a on the transmitting side and putting the data read out into the signal processor 22. When the telephone of the subscriber 20a is of the push-button dial type and a dial operation is performed by the subscriber 20a, the analog dial signal of the dial is converted to a digital signal in the line circuit 21a and this digital signal is used as a transmitting signal information SS1. The transmitting signal information from the subscriber is periodically written into the speech path memory 27a, is then read out of the speech path memory by addressing data (an address Ao), sent from the holding memory circuit 27a and SS1 is then written through a highway switch 28 into the speech path memory 26b on the receiving side by addressing data (an address Ax) sent from the holding memory circuit 27a. The speech path memory 26b is periodically read-out and the read out information SS1 is supplied to the multi-frequency signal receiver 23. When the dial information is detected in the receiver circuit 23, data SS2 is transmitted to and written into the speech path memory 26a on the transmitting side. When the data SS2 is read out of the speech path memory 26a by the access circuit 25, the data SS2 is processed as dial information in the signal processor 22 and is sent to the central processing unit. A signal SP generated in the multi-frequency signal receiver circuit 23 indicates detection of the above dial information. After signal SP has been produced, the signal processor 22 reads out the data SS2 of the memory 26a. One bit of the data bits of the memory cells of the holding memory circuit 27a is used for preventing the data SS2 from being transmitted to the subscriber 20a when the date SS2 is written into the speech path memory 26b on the receiving side. In FIG. 2, the last bit in each of the memory cells in holding memory 27a having the addresses Ao and Ax is used for this purpose. When the last bit is at a level "1", writing from the memory is possible and when it is at level "0", transmission to the subscriber is not effected because writing from the memory is not allowed.

Figures 3, 3A:
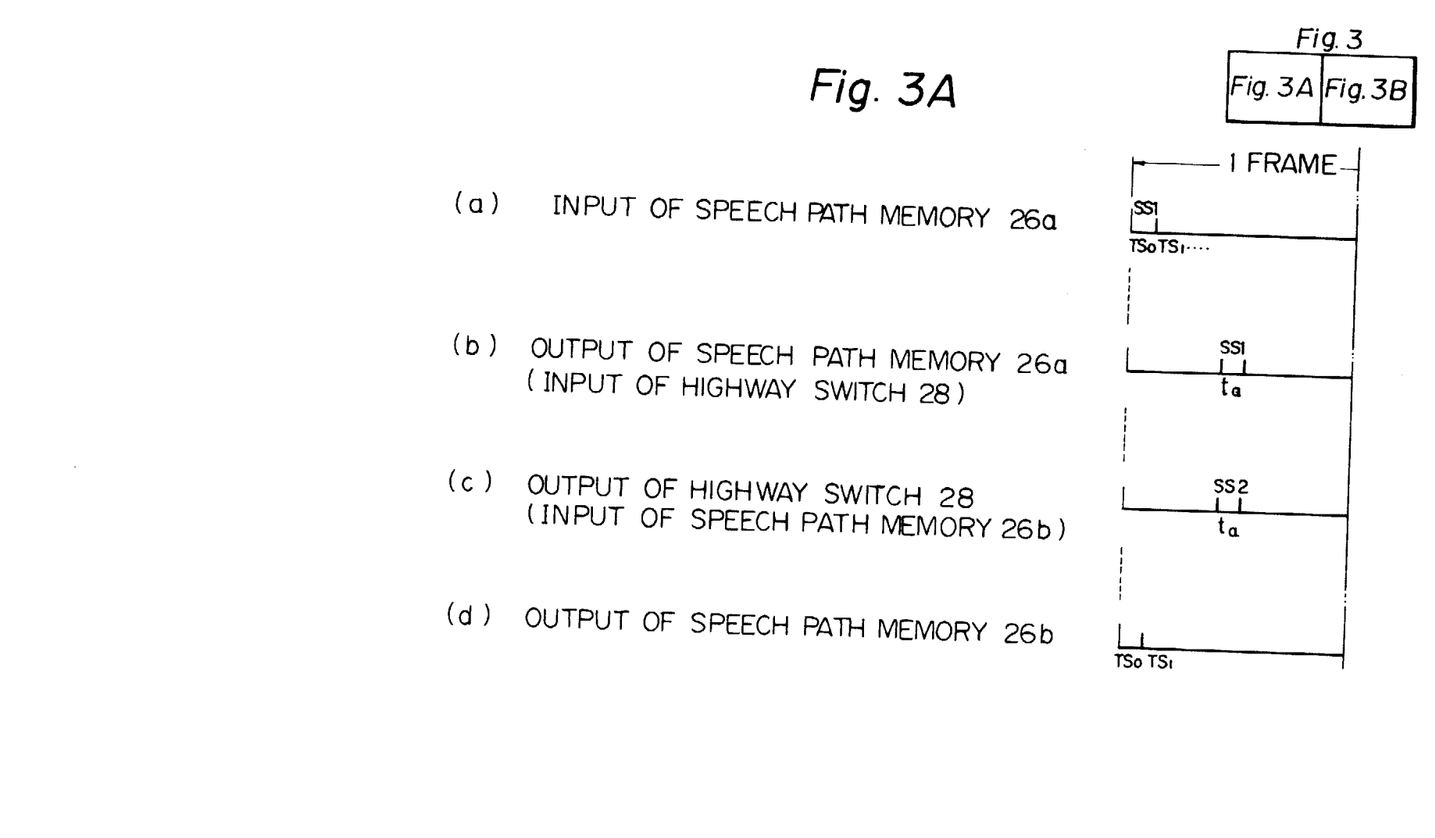
Figure 3B:
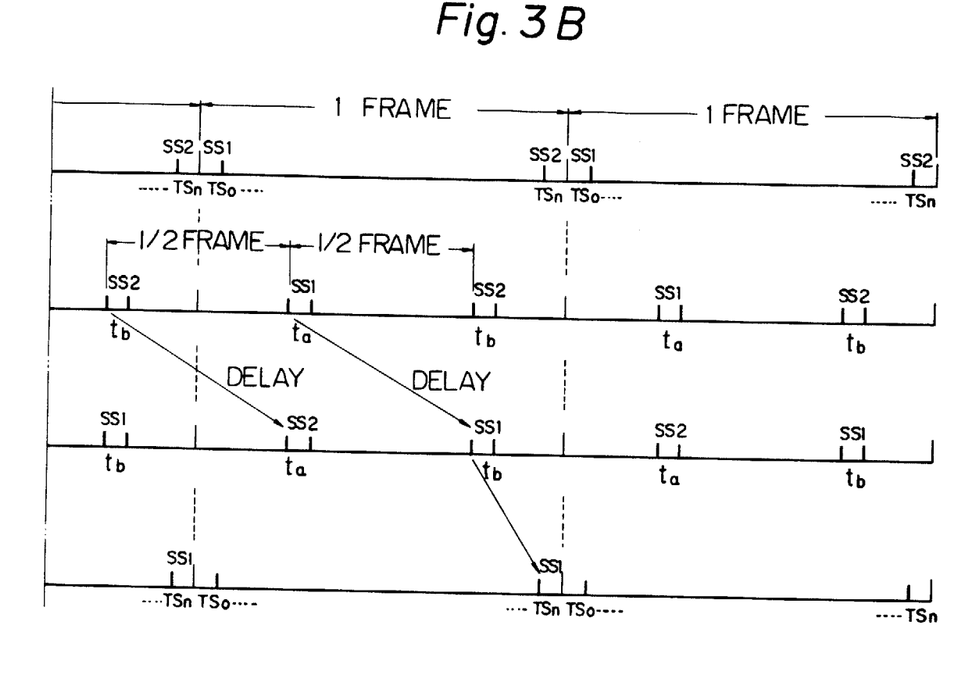

FIG. 3 graphically illustrates a time chart for each portion of the time division switch 24 of FIG. 2 when dial information is sent from the subscriber 20a. When the subscriber 20a operates the dial after an off-hook signal from the telephone set is received, the analog signal of the dial signal is converted into a digital signal by the line circuit 21a, the converted dial signal SS1 is assigned to a time slot TSO and is supplied to the speech path memory 26a as illustrated in (a) of FIG. 3. The output signal SS2 of the multi-frequency signal receiver 23 is assigned to a time slot TSn as illustrated in (a) of FIG. 3. The dial signal information SS1 is written into the speech path memory 26a at the address Ao and the output signal SS2 of the multi-frequency signal receiver 23 is written into the speech path memory 26a at the address Ax as illustrated in FIG. 2. The dial signal information SS1 and the data SS2 of the multi-frequency signal receiver 23 stored in the speech path memory 26a is read out under the control of the holding memory 27a at predetermined times ta and tb in the time slots TSo and TSn as illustrated in (b) of FIG. 3. The phase difference between the times ta and tb is ½ frame, the information SS1 and the data SS2 are delayed ½ frame, the dial signal information SS1 in the time slot ta illustrated in (b) of FIG. 3 is placed in the time slot tb at the output of the highway switch 28 as illustrated in (c) of FIG. 3, and the dial signal information SS1 is written into the memory cells in the speech path memory 26b at the address Ax. The information SS1 is again read out of the holding memory 27a and is sent to the multi-frequency signal receiver 23. When the multi-frequency signal receiver 23 detects the dial signal information SS1, the signal information SS1 is sent to the time slot TSn as a data output and is written into the speech path memory 26a at the address Ax. When the data SS1 is read out by the holding memory 27a, the data SS1 is sampled by the access circuit 25 so that it can be processed in the signal processor 22 as dial information.

Figure 4A:
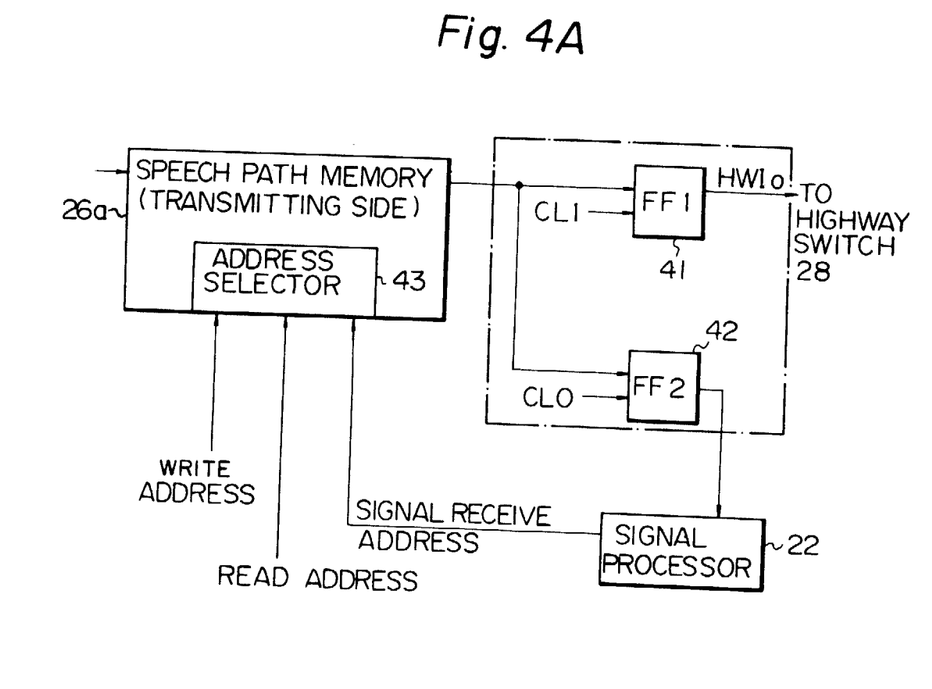
FIG. 4A illustrates an embodiment of the access circuit illustrated in FIG. 2.
Figure 4B:
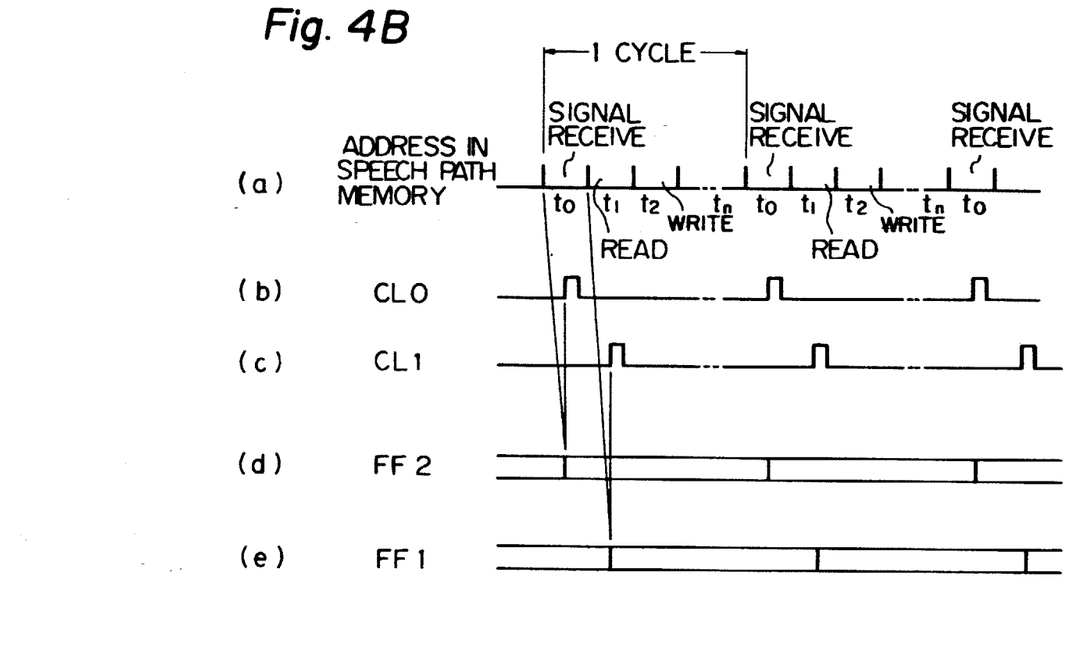
FIG. 4B graphically illustrates the relationship between the signals within the access circuit shown in FIG. 4A.

FIG. 4A is one embodiment of the access circuit 25 shown in FIG. 2. In FIG. 4A, flip-flop circuits 41 and 42 are connected to the output of the speech path memory 26a, and the outputs of the flip-flop circuits 41 and 42 are connected to the highway switch 28 and to the signal processor 22, respectively. Clock pulses $CL_0$ and $CL_1$ are supplied to the flip-flop circuits 41 and 42, respectively. An address selector 43 receives information concerning the signal receive address, the write address and the read address from the signal processor 22 so that the proper memory cell of the speech path memory 26a can be selected. FIG. 4B illustrates the time relation between (a) an address in the speech path memory 26a, (b) the clock pulse $CL_0$, (c) the clock pulse $CL_1$, (d) the operation of the flip flop 41 and (e) the operation of the flip-flop 42. The speech path memory 26a has n operational phases plus a signal receive time phase within each cycle, and the content of the speech path memory 26a is read out at a predetermined time.

Figure 5A:
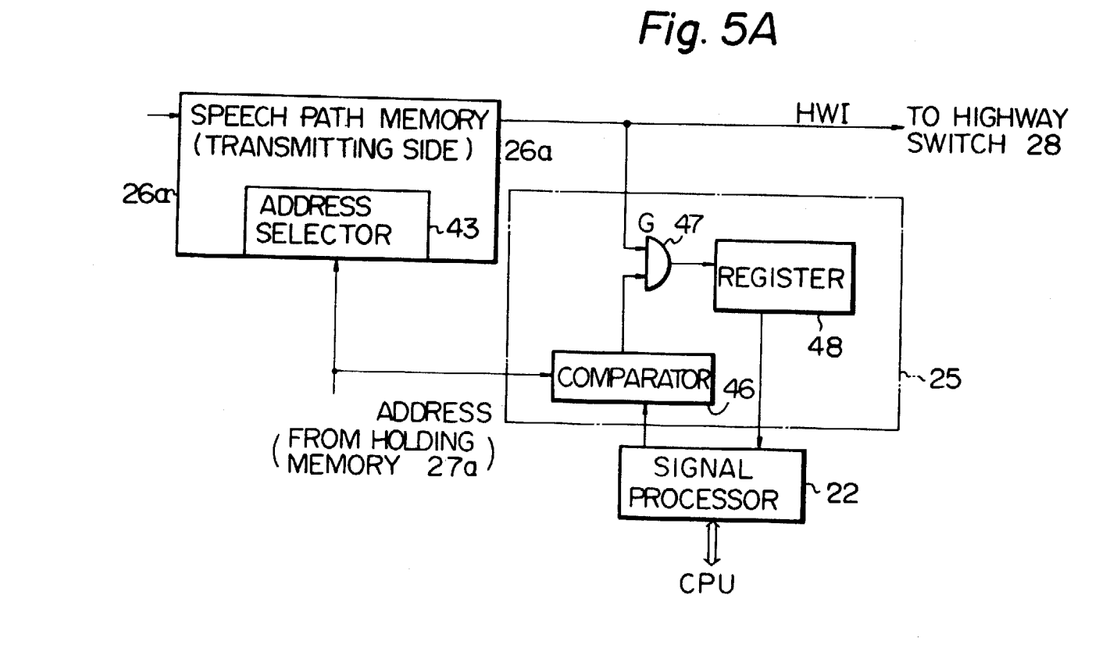
FIG. 5A illustrates another embodiment of the access circuit illustrated in FIG. 2.

FIG. 5A is another embodiment of the access circuit 25 shown in FIG. 2. Referring to FIG. 2, an address signal is supplied from the holding memory 27a to the speech path memory 26a on the transmitting side and to a comparator 46 (FIG. 5A) which compares the address from the holding memory with the information received from the signal processor 22. The output of the comparator 46 is supplied to an input terminal of a gate circuit 47 and the output of the speech path memory 26a is supplied to another input terminal of the gate circuit 47. The output of the gate circuit 47 is supplied to a register 48 and the output of the register 48 is supplied to the signal processor 22. In the access circuit 25 illustrated in FIG. 5A, the address in the speech path memory 26a, that is, an access time slot in the speech path memory 26a, has been previously determined and the read-out time of the access time slot is detected by the comparator 46. The circuit 25 of FIG. 5A is used when the specified data is detected and read from highway data that continuously flows.

Figure 5B:
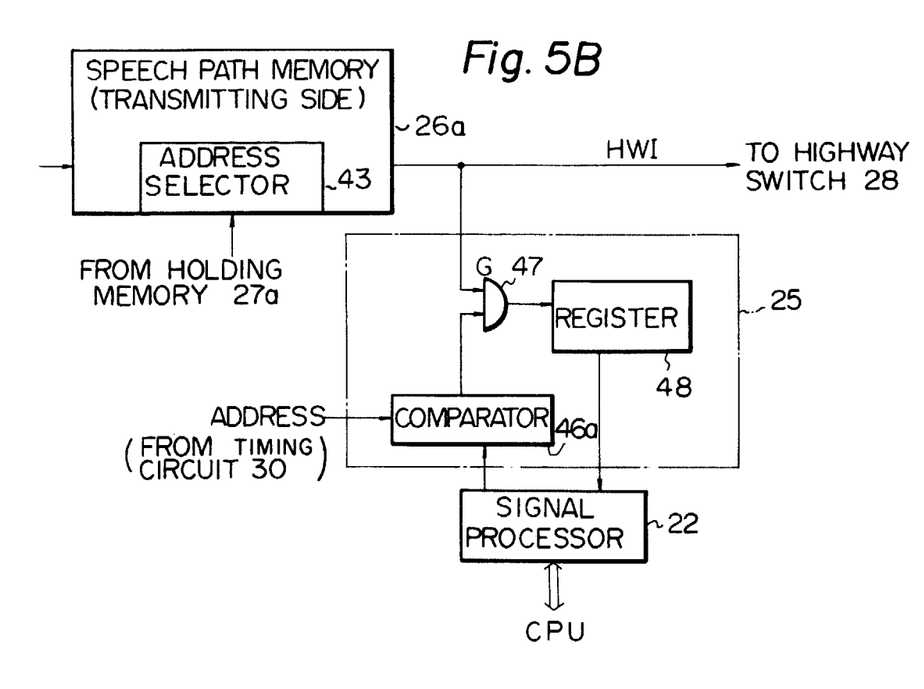
FIG. 5B illustrates another embodiment of the access circuit illustrated in FIG. 2.

FIG. 5B is a another embodiment of the access circuit 25 illustrated in FIG. 2. In the circuit 25 illustrated in FIG. 5B, a channel time slot has been previously determined and the read-out time of the assigned time slot is detected by a comparator 46a.

The operation of the time division switching system whenever a push-button dial signal is received is as described above. In the present invention, the signals of the multi-frequency signal receiver circuit 23 are handled in a similar manner.

If an arrangement is made so that the status signals representing the on-hook or off-hook state of the telephones, which comes from the line circuits 21a, . . . , 21n, and signals SP from the multi-frequency signal receiver circuit 23 are periodically read out and inserted into the speech path memory as SS1 data signals, a scanning signal line SCN need not be provided.

In the conventional electronic switching system shown in FIG. 1, since each of the interfaces of the time division switch 3 and signal processor 2 with the line circuits 6a, . . . , 6n, with the tone trunk 8, with the push-button dial signal receiver circuit 9 and with the multi-frequency signal receiver circuit 10 transmit different quantities of information, the practical physical equipment locations are considerably limited because of the system structure. However, if the above-mentioned structure of the present invention is adopted, a common interface with the time division switch 24 can be provided for the respective elements, the limitation on the practical equipment locations is moderated and enlargement of the system can be facilitated. Furthermore, if during the primary operation of the speech path memories 26a and 26b, that is, processing of digitized speech signals, such signals are read out and analyzed, occurrence of circuit malfunctions can easily be detected, because speech signals change continuously during a telephone conversation and if such changes are not observed it is an indication of a malfunction.

We claim:

1. A time division electronic switching system operatively connected to subscriber connection equipment and other telephone office connection equipment, the subscriber and other telephone office connection equipment generating dial information, including, as structural elements, a signal processor operatively connected to a central processing unit, a multi-frequency signal receiver operatively connected to both the signal processor and a time division switch including a speech path memory having transmitting and receiving sides, wherein said signal processor generates a control signal, said system comprising:

a multi-frequency signal receiver circuit of the multi-frequency receiver, having an output, including dial information detection means for detecting the dial information and for generating detected dial information;

holding memory means, operatively connected to the speech path memory, for controlling the writing of the detected dial information from said multi-frequency signal receiver circuit into the speech path memory; and access means, operatively connected between the speech path memory means and the signal processor, for controllably reading out the detected dial information written in the speech path memory and supplying the detected dial information to the signal processor in dependence upon the control signal, whereby the signal processor supplies the detected dial information to the central processing unit.

2. A time division electronic switching system according to claim 1, wherein when said multi-frequency signal receiver circuit detects the dial information stored in the speech path memory and generates a detected output signal.

3. A time division electronic switching system according to claim 2, wherein the detected output signal is supplied to the signal processor, whereby the signal processor initiates the read out of the speech path memory by said access means by transmitting the control signal to said access means.

4. A time division electronic switching system according to claim 2, wherein when the detected output signal is generated during periodic read out of the receiving side of the speech path memory the detected dial information is written into the speech path memory on the transmitting side.

5. A time division electronic switching system according to claim 1, wherein the signal processor generates a write address, a read address and a signal receive address, where the speech path memory has a speech path output, has a plurality of memory cells, and has an address selector which selects a memory cell based on the signal receive address, the write address and the read address from the signal processor, wherein said access means is operatively connected to receive a clock pulse, wherein said access means comprises a flip-flop circuit having a first input operatively connected to the speech path output of the speech path memory, having a second input supplied with the clock pulse which is generated at a time corresponding to the generation of the signal receive address, and having an output operatively connected to the signal processor.

6. A time division electronic switching system according to claim 1, wherein the signal processor generates a predetermined address, wherein said holding memory means generates a holding address, wherein the speech path memory has memory cells each cell having a memory cell address and has a speech path output, wherein said access means comprises:

a comparator, having a first input operatively connected to said holding memory means for receiving the holding address corresponding to a memory cell address in the speech path memory, having a second input operatively connected to receive the predetermined address, and having an output, for comparing the holding address with the predetermined address transmitted from the signal processor, and for generating an equals signal whenever the compared addresses are equal;

an AND gate having a first input operatively connected to the speech path output of the speech path memory, having a second input operatively connected to the output of said comparator and having an output; and a shift register having an input operatively connected to the output of said AND gate and having an output operatively connected to the signal processor.

7. A time division electronic switching system according to claim 1, wherein the speech path memory means has a speech path output and has time slots, wherein said signal processor generates a signal processor address, wherein said access means is operatively connected to receive a timing address, wherein said access means comprises:

a comparator, having a first input for receiving the timing address corresponding to a time slot in the speech path memory, having a second input operatively connected to the signal processor for receiving the signal processor address, and having an output, for comparing the timing address with the signal processor address from the signal processor, and for generating an equals signal whenever the addresses compared are equal;

an AND gate having a first input operatively connected to the speech path output of the speech path memory, having a second input operatively connected to the output of said comparator and having an output; and a shift register having an input operatively connected to the output of said AND gate and having an output connected to the signal processor.

* * * * *